United States Patent
Thomas et al.

[19]

[11] Patent Number: 6,116,225
[45] Date of Patent: Sep. 12, 2000

[54] LAMINAR FLOW NOZZLE

[76] Inventors: Danny Thomas; Thomas Marabanian; Edward Parker, all of 603 H Country Club Dr., Bensenville, Ill. 60106

[21] Appl. No.: 09/080,177

[22] Filed: May 16, 1998

[51] Int. Cl.[7] ............................................. F02M 23/00
[52] U.S. Cl. ........................ 123/590; 123/1 A; 123/531; 123/585; 239/418
[58] Field of Search ....................... 123/590, 1 A, 123/585, 531; 239/418

[56] References Cited

U.S. PATENT DOCUMENTS

| | | | |
|---|---|---|---|
| 4,798,190 | 1/1989 | Vaznaian et al. | 123/531 |
| 4,827,888 | 5/1989 | Vaznaian et al. | 123/531 |
| 5,302,112 | 4/1994 | Nabors et al. | 431/8 |
| 5,699,776 | 12/1997 | Wood et al. | |
| 5,771,866 | 6/1998 | Staerzl | 123/531 |

OTHER PUBLICATIONS

National Dragster, vol. XXXVIII, issue 13, Apr. 11, 1997, last page (advertisements).

*Primary Examiner*—Noah P. Kamen
*Assistant Examiner*—Hai Huynh
*Attorney, Agent, or Firm*—Adrienne B. Naumann

[57] ABSTRACT

A novel laminar flow nozzle for fuel injected racing cars is described herein. One novel feature comprises a narrow angle between converging conduit component channels. These channels, in turn, supply vaporized fuel and nitrous oxide to the main chamber of the nozzle. Another important novel feature is the integral structure of the nozzle; the conduit components, generally rigid and cylindrical in shape, are physical integral components of the nozzle. The result of our invention is a nozzle with a smooth laminar flow of gases which results in less turbulence and greater horsepower.

3 Claims, 6 Drawing Sheets

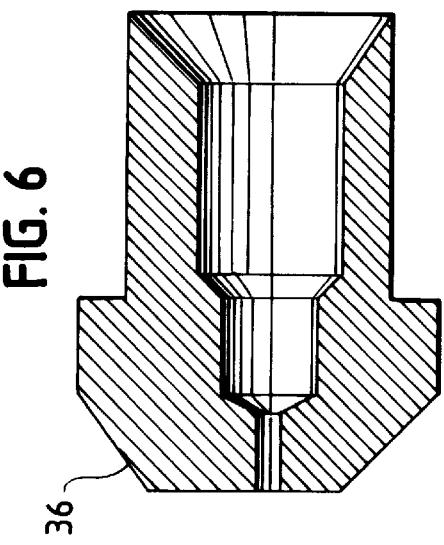
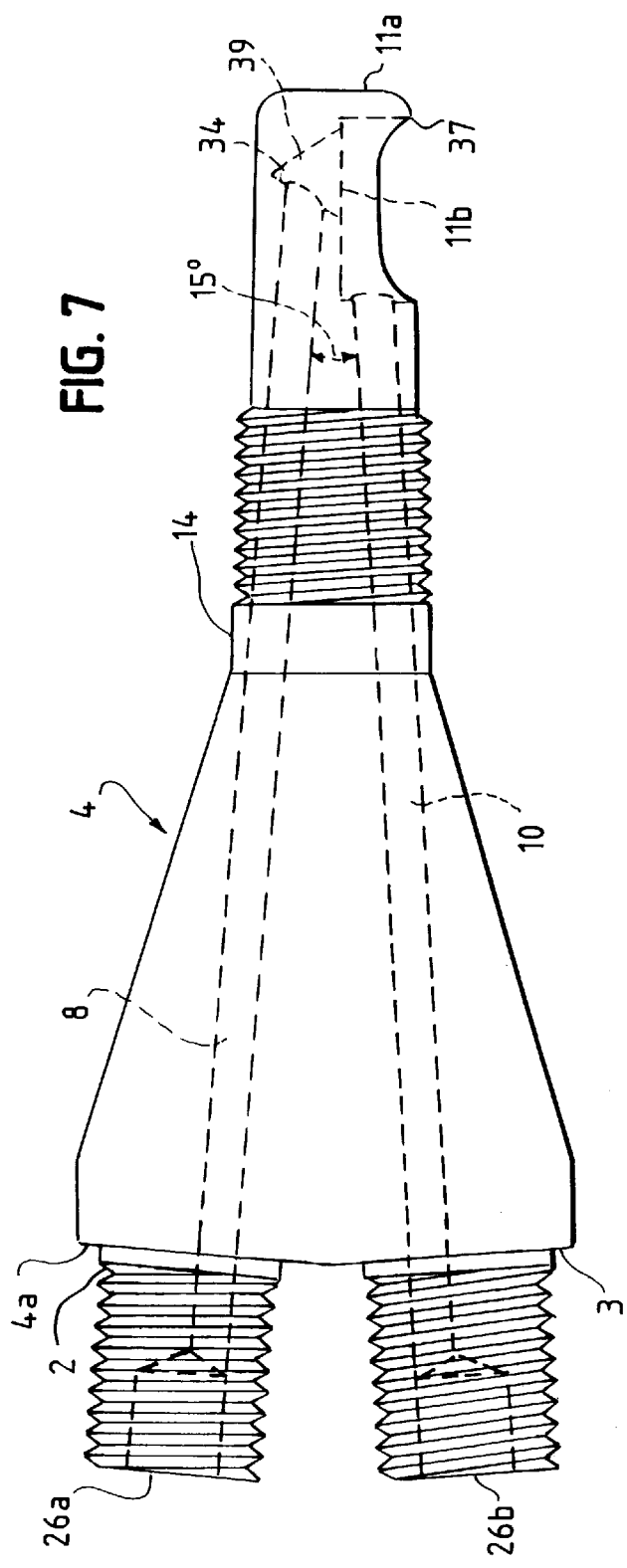

LAMINAR FLOW NOZZLE

BACKGROUND OF THE INVENTION

The present invention relates to a device functioning as a nozzle for mixing nitrous oxide with fuel for maximum horsepower in a racing car engine. More particularly the present invention, hereinafter referred to as the laminar flow nozzle, relates to a nozzle comprised of only one integral component.

In our invention, there are three protuberances integrally and physically part of a nozzle chamber. These protuberances are designated as cylindrical conduit components. One such cylindrical conduit component contains liquid fuel, while the other transports nitrous oxide in the preferred embodiment. In other embodiments other gaseous oxidizers are suitable as well.

Each of these two cylindrical conduit comprises means for a stream of gas or fuel to flow into the nozzle chamber. In the preferred embodiment, each cylindrical conduit specifically contains one integrally formed channel through which either vaporized fuel or an oxidizer flow through the nozzle. Both channels, continue through nozzle chamber in a manner which becomes increasingly parallel.

The channels terminate at the second, opposite side of the nozzle chamber. A third integral threaded cylindrical conduit at this second opposite end contains an emitter and its orifice. Gas enters through the emitter and mixes with droplet fuel in a contiguous dispersing chamber. From the dispersing chamber the combined gas and fuel enter the engine manifold. This third conduit component is physically a part of the nozzle chamber and comprises protuberance-like characteristics. The emitter and conduits are well known to those versed in this art.

Our laminar flow nozzles can be any size, length, shape, curvature, depth or length within the scope of this invention. However, in the preferred embodiment, the channels feeding the fuel and nitrous oxide to the opposite, second end of the nozzle must (i) approach each other in a near linear fashion; and (ii)comprise physically internal components of the nozzle.

Our novel nozzle is extremely lightweight which makes it ideal for racing vehicles. Combustion of fuel and nitrous oxide is less turbulent, resulting in a higher burst of horsepower. There has been a long-standing need in the racing car industry for a lightweight nozzle which is inexpensive and fits most manifolds and solenoids. The fit and configurations of the manifolds and solenoids, as well as their attachments to the remainder of the vehicle, are well known to those skilled in the art.

Nitrous oxide adds more oxygen to the engine, thus making fuel combustion more complete. In the prior art, if there is insufficient fuel to burn, however, nitrous oxide can damage the engine. Our invention's consistent flow of fuel prevents this phenomenon from occurring. More horsepower is created by our invention because of less turbulence and empirical loss of energy due to shock waves.

The cylindrical conduit components in the preferred embodiment are rigid. In the preferred embodiment the nozzle is generally comprised of aluminum because it is lightweight, withstands stress, and is easy to machine drill by those skilled in this particular art. Other suitable materials for nozzles include stainless steel, copper or brass.

In the preferred embodiment, 118 octane Torco™ is the fuel of choice. Alternatives include lower octane fuels obtained from the ubiquitous "gasoline station." Octane readings of approximately 116 to 112 are recommended, but approximately 112 to 118 octane readings comprise an acceptable range. One hundred per cent ethyl alcohol is also appropriate. Octane numbers ranging from approximately 112 to 116 are recommended, but for the preferred embodiment the most desirable and effective fuel is 118 octane Torco™ racing fuel.

In the preferred embodiment, introduction of nitrous oxide adds oxygen to the engine, so that fuel oxidation (combustion) is more thorough and complete inside the nozzle tip. Nitrogen provides a stable chemical environment for the oxygen prior to combustion. Excessive oxygen in the engine will cause undesirable heat, stress the pistons, and eventually detonate. Our invention also adds additional fuel through our novel nozzle, which smoothly and predictably provides additional fuel by a more linear flow.

Air can serve as an alternative oxidizer. However, the advantage of using nitrous oxide is the resulting control of oxygen levels for complete fuel combustion. The relative linear approach of combining the flow of nitrous oxide and fuel at the nozzle tip is important because: (i) otherwise nitrous oxide will traverse the fuel directly to the cylinders, causing overheating of the motor; and (ii) the exact mixture must be maintained to balance increased horsepower with minimal temperature increases in the engine.

Fuel pressure ratings for our nozzle varies on motors using fuel injection systems. The fuel pressure to the nozzle should range from approximately 32 to 42 pounds per square inch (psi). On motors using carburetors, the recommended fuel pressure to the nozzle ranges from approximately six (6) to six and one/half (6½) pounds per square inch.

Our invention includes the following, but the list is not necessarily inclusive:

(i) integral threaded means as cylindrical conduit components of the nozzle, (ii) near-laminar flow through the nozzle chamber, (iii) combustion of vaporized fuel and oxidizer, which is initiated inside specialized portions of the nozzle, (iv) the acute angle of approximately 15 degrees or less at which the nitrous oxide and fuel physically approach each other prior to physically mixing, (v) the one-piece design of the nozzle. It appears that prior art racing car nozzles have screw-like detachable means penetrating the exterior of the nozzle chamber to connect the nozzle chamber to fuel and nitrous oxide. Empirically this results in severe turbulence when the fuel and gas meet.

(vi) in our preferred embodiment, our nozzle with the above characteristics, in combination with a particular fuel recently developed for high speed vehicle racing.

(vii) our methodology of producing orifices and channels within the nozzle which produce channels which are straight and smooth. The operator versed in the art uses a programmed machine on a nozzle with less curvature in the protruding threaded components.

(viii) our methodology of producing a unicomponent nozzle.

(ix) use of jets to control the amounts of oxidizer and fuel entering the nozzle.

In most prior art, the angle between the incoming fuel and oxidizer is approximately between 25 and 35 degrees. This causes the oxidizing gas to blow through the fuel without adequate mixing. Our laminar flow nozzle decreases this angle and allows fuel and gaseous oxidizer to mix more completely.

In the preferred embodiment for racing vehicles, a fuel pump physically separate from the fuel regulator is useful. Fuel pressure recommended ratings for the preferred embodiment range for carbureted engines from approximately six to six and one-half pounds per square inch(psi). Carburetor motors mix fuel and air above the motor in an apparatus physically connected to the motor. This combination flows through the manifold to the cylinders within the motor.

In all vehicles there is a tank to hold the fuel. To move the fuel to the motor a pump is required. The pump moves the fuel from the tank through a feed line to the motor. There is a regulator on this feed line. The regulator will adjust the pressure or amount of fuel delivered to the motor.

The temperature of the nitrous oxide (NO2) within the nozzle, ranges between approximately minus 100 degrees F. to minus 112 degrees F. as it flows through a feed line to the nozzle. There is no need to regulate the temperature: At 87 degrees F. nitrous oxide spontaneously transforms to gas.

The nitrous oxide is held in a bottle or feed line, which leads to the nozzle. The ideal temperature of nitrous oxide within this bottle is 87 degrees F. At 87 degrees F. this bottle is pressurized to the recommended range of approximately 900–1000 psi.

Ratios of vaporized fuel to nitrous oxide in the preferred embodiment range from between approximately 1.25 parts vaporized fuel to 1.25 parts nitrous oxide, volume per volume. Another suitable ratio is 1.00 parts vaporized fuel to 1.25 nitrous oxide, volume per volume, depending upon the requirement for additional horsepower.

Analogous nozzles from the prior art for racing car engines are generally comprised of separate physical components. Generally two separate metal cylindrical conduits with a threaded surface lead into the nozzle. Each component is fastened to the nozzle chamber by a threaded screw means.

In this prior art, each of two conduits contain a single channel for gas or fuel flow. They both enter from the first, upper side of the nozzle chamber, but at an angle which forms a "y" shaped configuration within the nozzle chamber. The angle thus formed ranges from approximately 25 degrees to 35 degrees.

This range empirically correlates with greater turbulence when the gas and fuel spontaneously combust within or near the nozzle. Experiments and field tests also support these figures. Moreover, expensive modification of nozzle mounts on the manifold and solenoids occur with prior art prototypes within this angle of convergence range. Combustion at this range of angles 25 to 35 degrees, after convergence in the upper section of the nozzle, creates turbulence and eddies.

In the prior art, also attached at the opposite, second side of the nozzle's chamber is a third, physically separate conduit component. This conduit component further comprises an interior channel which carries the mixture of gases through emitter components to the engine manifold. This third conduit is also attached by a threaded means to the body of the nozzle, and generally must be applied by tightening with a screw wrench or similar tool.

The Fogger™r, manufactured by Nitrous Oxide Systems, Inc. (NOS) generates horsepower which is proportional to the amount of vaporized fuel oxidized on each power stroke of a piston.

The Fogger™r, also comprises separate cylindrical conduits for transporting gases into the nozzle chamber. This means more weight and/or breakage when attaching each conduit to the nozzle chamber. Most significantly, unlike our novel invention, the angle between the two entry cylindrical conduits channels is approximately 25 to 35 degrees.

The Power Wing™ nozzle manufactured by The Nitrous Works can be retrospectively fitted to a ⅛-NPT (normal pipe tap) port. As with the previous prior art prototypes, supra, there are at least three physically separate cylindrical conduits attached to the main nozzle by screwlike means. One-eight NPT is the size of the aperture required to screw the nozzle into the manifold.

In the prior art, each cylindrical conduit, once fitted to the nozzle, carries vaporized fuel and nitrous oxide. The channels or tubing converge at a wide angle, ranging from approximately 25 degrees to 35 degrees. This angle experimentally correlates with greater turbulence when gas and fuel combust near the upper, first side of the nozzle chamber. Moreover, modification of nozzle mounts on the manifold and solenoids are often required.

In the prior art, screwlike means attaching these cylindrical conduit components to the nozzle are easily broken during the tightening process. Moreover, a plurality of such additional attachments add considerable weight to the engine system. There is also difficulty drilling orifices and channels directly into a nozzle. In our invention it is easier to drill such orifices due to relative lack of curvature of the conduit components, and which are integrally attached to the nozzle chamber.

Some prior art conduits are lined with metal tubing. The rationale was the tubing facilitated an even flow of gas and fuel. Without physical separation by inert tubes made of copper or brass, in the prior art, gases combust prematurely at the first upper end of the nozzle chamber. This premature exposure lessens the overall potential horsepower from the rapidly increasing pressure and energy from combustion.

In the prior art, operators drilled orifices from the inlet ports on the upper first side of the nozzle., to the outlet for mixed gas and fuel at the second lower end of the nozzle. The difficulty arises when operators could not drill straight, regular orifices and channels with an angle of merge, e.g., 25 to 35 degrees, as described supra. Often these operators must drill from the first upper and second lower ends of the nozzle simultaneously to achieve channels which are contiguous.

This prior art approach results in counterproductive turbulence throughout the nozzle channels. Our invention incorporates the integral threaded conduits, reduces the angle of merge and comprises orifices with a wider diameter and channels which have no physical irregularities.

The Billet Atomizer™, also manufactured by The Nitrous Works, comprises a plate system for the area of turbulence located at the angle where the two channels converge. The billet atomizer has at least three physically separate cylindrical conduit components with disadvantages already discussed supra. The angle of convergence of the two gases is also very wide, resulting in more turbulence and premature combustion.

U.S. Pat. No. 5,699,776 (Wood et al.) comprises a nozzle for mixing oxidizer with fuel. The mixed oxidant gas from an emitter and fuel droplets from a second channel converge in a dispersing chamber. The mixture is carried by air flow moving through an intake manifold passageway to a cylinder, where combustion occurs.

Our invention also includes, in combination in the preferred embodiment, a recently developed racing fuel. It comprises in combination, a necessary component of our invention in the preferred embodiment thereof.

Our invention also includes a methodology for drilling the orifices into the nozzle chamber which are contiguous with the channels therein. Use of a drill with a computer programmed machine results in wider orifices and straighter, less irregular and more precisely located channels. This methodology results in less turbulence within the nozzle. The computer program and associated machine are well known in the art.

SUMMARY OF THE INVENTION

Our present invention, the laminar flow nozzle, provides an improved component for any engine. Our invention comprises a single nozzle with protuberance-like cylindrical conduit components further comprising orifices, ports and jets.

Because of the physically integral structure, our invention experiences less breakage, because there are no physical separate threaded components. In contrast the brass pieces holding the three conduit components to the nozzle chamber must be tightened in the conventional art. Moreover, there is generally 8% more volume of fuel through our nozzle. This gives our invention an advantage because the higher the volume of fuel, the higher the horsepower gain.

Most significantly, there is also less turbulence when the fuel stream meets the nitrous oxide stream. The near parallel approach increases laminar flow and smooth combustion. This is particularly true of the preferred embodiment. However, this feature also lies within the scope of our invention for nozzles of different shapes, conduit components, temperatures, pressures, characteristic gas ratios and other variables.

The requirements of our invention in the preferred embodiment are:

(1) that an oxidizer, such as nitrous oxide, and fuel approach at an acute angle of approximately 15 degrees or less to create nearlaminar flow at the second opposite end of the nozzle;

(2) cylindrical conduits and a chamber physically comprise one integral nozzle;

(3) in the preferred embodiment, in combination with the above described nozzle the fuel should be Torco™ 118$_r$ with the physical characteristics described infra;

(4) the methodology of producing orifices and channels should comprise production of orifices and channels with our nozzle, which produce less turbulence by using a computer programmed machine.

Accordingly, an object of the present invention is to provide an improved nozzle for racing vehicles in which the cylindrical conduit components are integral protuberances of the nozzle chamber.

Another object of our invention is to mix fuel and nitrous oxide converging at an angle of approximately 15 degrees at the second opposite end of a nozzle.

Another object of the present invention is to provide a nozzle in which the vaporized fuel and nitrous oxide, or another appropriate oxidizer for combustion, converge at an angle of approximately 15 degrees or less thus eliminating turbulence.

Yet another object of the present invention is provide a lightweight nozzle, so that the entire weight of a racing vehicle is lessened when the nozzle is incorporated therein.

A further object of the invention is to provide a nozzle in which there is no breakage of screwlike means which physically connect the conduit components to the nozzle chamber.

Another object of the invention is to provide a nozzle in which the horsepower of the vehicle is enhanced by laminar flow of nitrous gas and vaporized fuel.

Another object of the invention is to provide a nozzle which is less expensive to produce because there are fewer separate components.

Another object of our invention is, in combination with a particular racing fuel in the preferred embodiment, produce maximum horsepower, but in a controlled, most energy efficient manner.

Another object of our invention is a methodology of drilling channels within the conduits components with a computerized machine, by which said channels contiguous with the entering orifices are less irregular.

These and still other objects and advantages of our invention will become apparent from the following description of the preferred embodiment of the present invention, as well as other embodiments.

BRIEF DESCRIPTION OF THE ILLUSTRATIONS

FIG. 6 illustrates a schematic view of a jet.

FIG. 7 illustrates a longitudinal cutaway view of a nozzle with emitter components disclosed.

DETAILED DESCRIPTION OF THE INVENTION

Our present invention, the laminar flow nozzle 1, is comprised of aluminum in the preferred embodiment. However, the scope of our invention contemplates other appropriate metals and materials, including but not limited to brass or copper.

Figure 1:
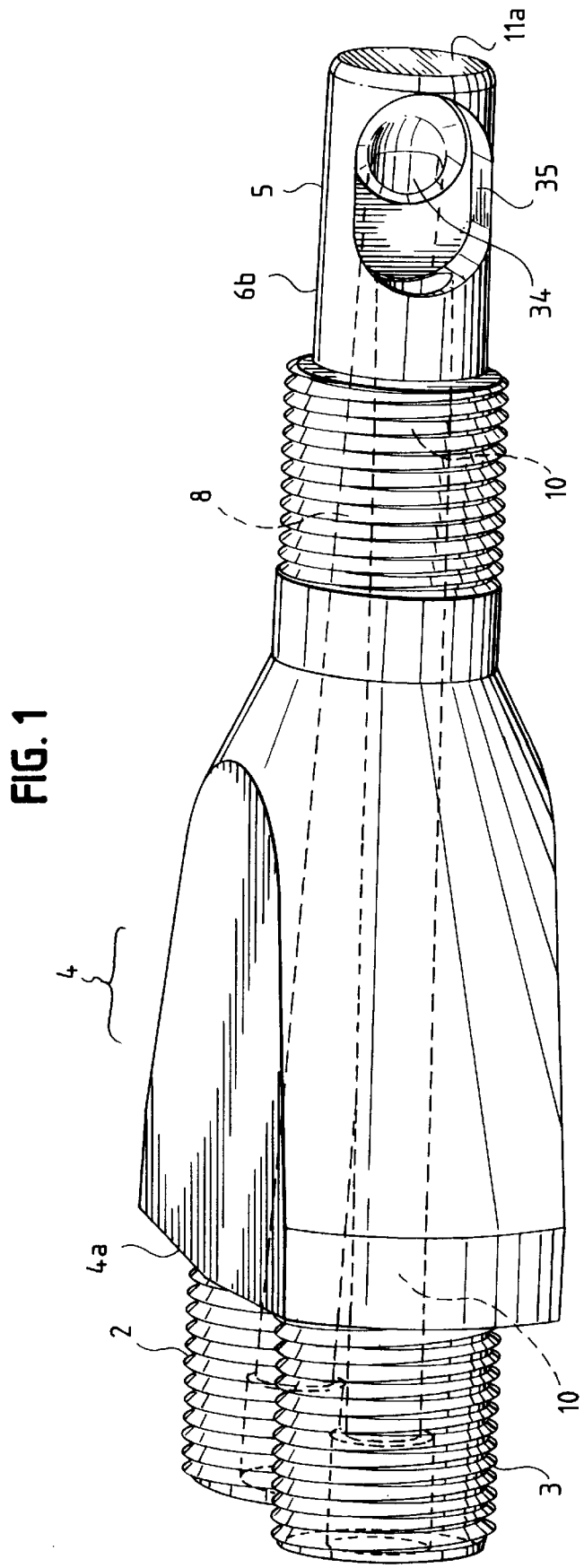
FIG. 1 is a partial full view of our new nozzle.

As illustrated in FIG. 1, in our preferred embodiment nozzle 1 has two integral means for transferring gas to nozzle chamber 4, known as cylindrical conduit components 2 and 3. Conduit 2 carries gaseous oxidizer (in the preferred embodiment nitrous oxide) and conduit 3 transports liquid fuel into the nozzle 1. Cylindrical conduits 2 and 3 are located at the first, upper side of nozzle chamber 4.

Figure 2:
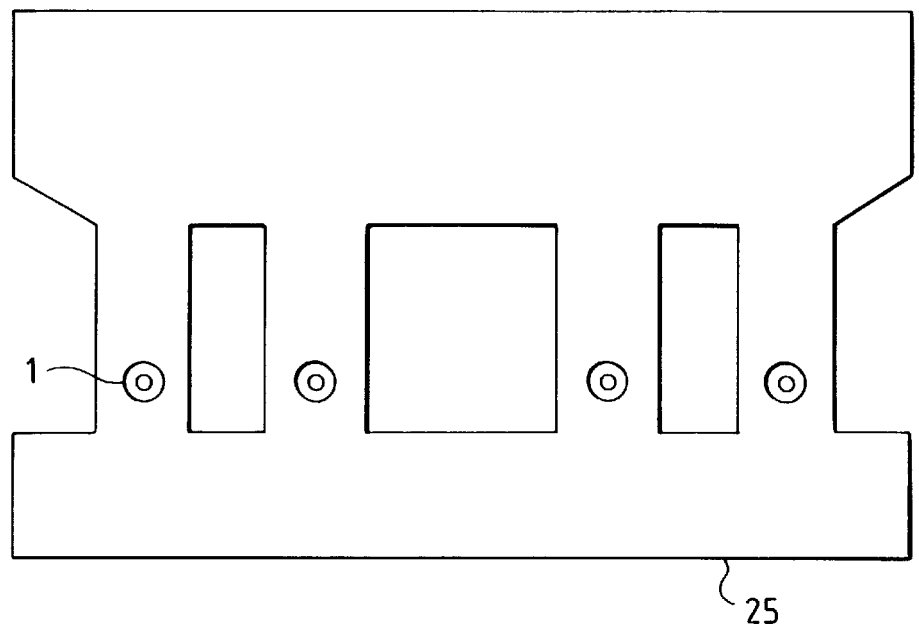
FIG. 2 illustrates schematic side view of our nozzle locations along a manifold.
Figure 3:
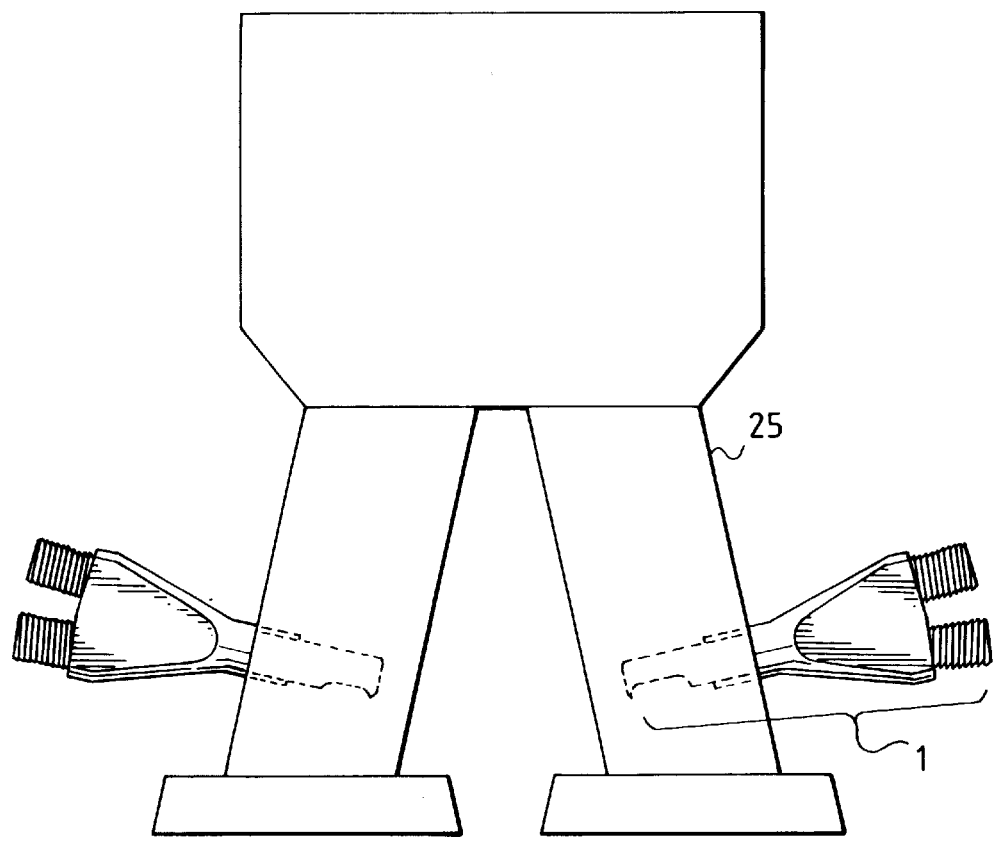
FIG. 3 illustrates a front view of a manifold and relative positions of our nozzles.

Again referring to FIG. 1, also protruding from the second opposite side 6$b$ of nozzle chamber 4, is cylindrical conduit component 5 (which connects to engine manifold 6). Nozzle chamber 4 of the nozzle 1 comprises a first upper side 4$a$, in which fuel and nitrous oxide initially enter through conduit components 2 and 3. Nozzle chamber 4 also has a second, opposite side 6$b$, from which combusting gas and fuel is transported to engine manifold 54. See FIGS. 2 and 3.

Again referring to FIG. 1, nozzle 1 is connected at its second, lower end 6$b$ to a connecting manifold 54 leading to the motor or engine. At its first upper end, the nozzle is connected to fuel and gas supplies within the vehicle by methods well known by those experienced in the industry, and described infra.

Figure 4:
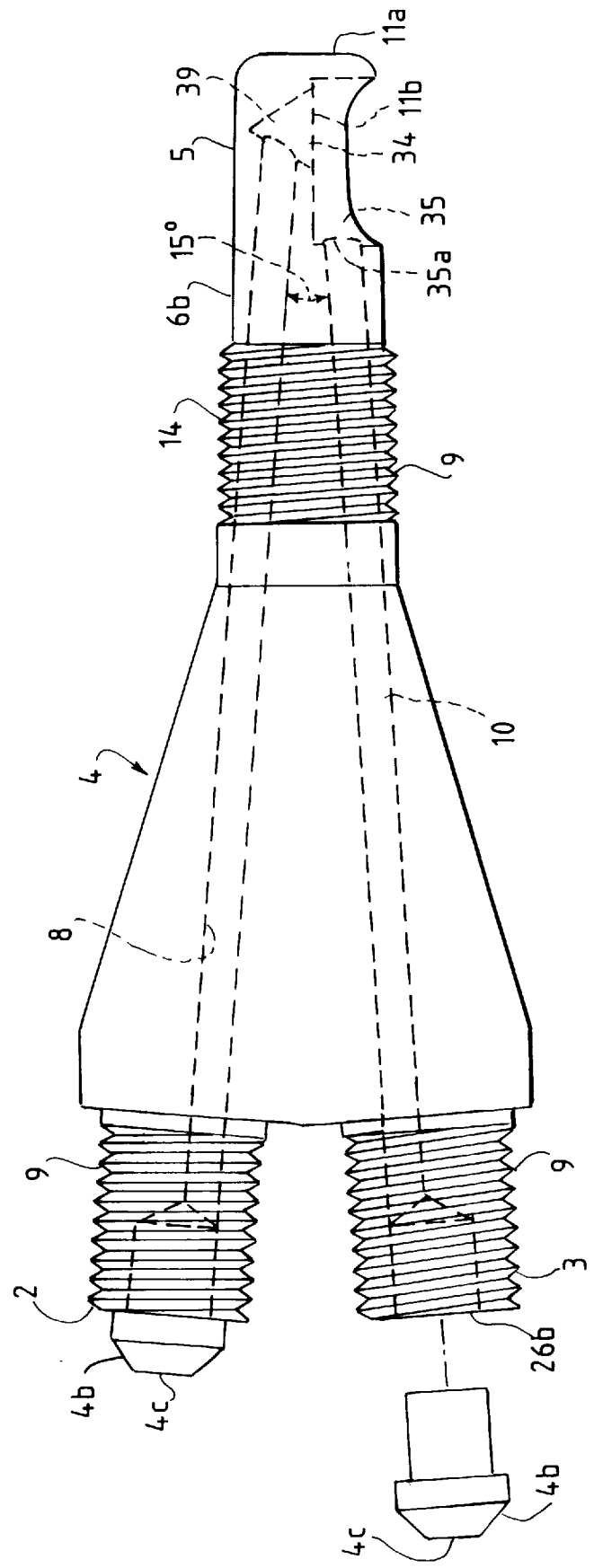
FIG. 4 illustrates a cut away longitudinal view of our nozzle with jets.

Referring to FIG. 4, cylindrical conduit components 2,3,5 are rigid. Conduit component 5 has a ⅛–24 normal pipe thread. Conduits 2 and 3 have a 0.35–24 thread (e.g., revolutions of raised ridge per inch). Cylindrical conduits 2,3,5 are physically integral parts of nozzle chamber 4, and in the nature of protuberances therefrom.

The ⅛–24 NPT is a screw-like means to fit nozzle 1 into the manifold 54. The 0.375–24 is a compression fitting thread used to keep nitrous and fuel from leaking as the conduits penetrate the upper first end of the nozzle 4. See FIG. 4. these measurements are well known to those of ordinary skill in this particular art.

Again referring to FIG. 5, channel 8 is located within conduit component 2. It comprises an interior cylindrical elongated structure which contains the flow of oxidizing gas. Channel 8 is created by drilling with a computerized machine well known in the art for this purpose.

Our nozzles are CNC machined. CNC Machines are computerized machines for cutting, drilling, etc., and are extremely accurate. To date, this machine is a state of the art means to guarantee accuracy and consistency in drilling and boring through delicate metal surfaces and structures. In our preferred methodology and best mode our orifices and channels are finalized in this fashion; however, other approaches would also lie within the scope of our invention with respect to our novel methodologies.

Figure 5:
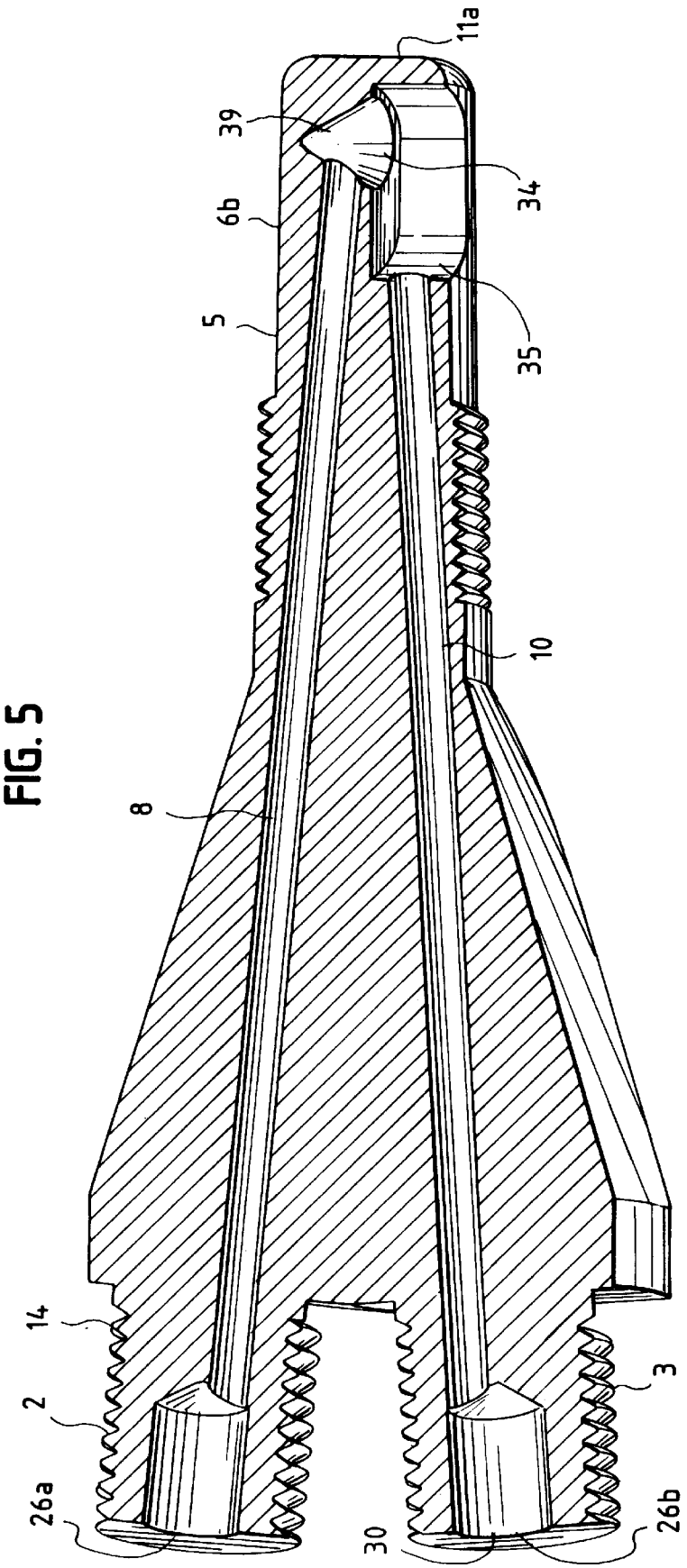
FIG. 5 illustrates a three dimensional view of our nozzle with emitter components structure disclosed.

Referring to FIGS. 4 and 5, Channel 10 is also drilled into nozzle 1 by the above described computerized mechanical means. Channel 10 transports a stream of fuel to conduit component 5. Cylindrical conduit component 5, further comprises tip 11a, emitter 34, and emitter orifice 11b. Dispersing chamber 35 is immediately adjacent to and contiguous with emitter 34 through emitter orifice 11b.

Orifice 11b of emitter 34 sends oxidizing gas to dispersing chamber 35. Fuel from channel 10 enters dispersing chamber 35 through an aperture in the wall of dispersing chamber 35. Chamber 35 sends the mixed gas and fuel on to the manifold (not seen).

As seen in FIGS. 4 and 6, jets 4b each have an orifice 4c between approximately 0.16 to 0.136 inches in diameter. Jets 4b regulate the supply of fuel and oxidizer into nozzle chamber 4. See FIG. 6. Each orifice 4c is between 0.016 to 0.136 inches in diameter, to regulate the rate of fuel or gas entry into nozzle 1.

According to the NHRA(National Hot Rod Association) rules, any emitter orifice 11b within cylindrical conduit 5 and leading to manifold 21, can reach a maximum diameter of 0.110 inch. According to the IHRA (International Hot Rod Association) rules, orifice 11b can be up to 0.116 inch in diameter.

Referring now to FIG. 5, emitter orifice 11b is approximately 0.13 degrees in curvature. The angle at which channel 8 and channel 10 physically converge at the emitter and dispersing cavity 35 is approximately 15 degrees.

In the preferred embodiment, nozzle 1 length, from the tip of the fuel and gas conduits 2,3 to the tip of the conduit component 5 leading to the manifold, is approximately 2.810 inches. Each cylindrical conduit 2,3,5 is approximately 0.443 inches in length, while the nozzle chamber 4 is approximately 0.995 inches in length. As seen in FIGS. 5 and 7, channels 8,10 are each approximately 0.193 inch in depth at each entry port 26a,26b into nozzle chamber 4. Each separate entry port 26a,26b are shown in FIGS. 5, 7. Each port 26a,26b are means by which fuel and an oxidizer (in the preferred embodiment nitrous oxide),initially enter upper first side 4a of nozzle chamber 4. The length of conduit component 5's threaded portion is approximately 0.380 inches. The tip portion 5 is approximately 0.665 inch in length. See FIG. 1.

FIGS. 4 and 5 illustrate that each conduit component 2,3 for fuel or nitrous oxide comprises entry ports 26a,26b. Each port in the preferred embodiment is approximately 0.193 inches wide and 0.210 inches deep within nozzle 1.

The smooth cylindrical interiors of conduit components 2,3 are approximately 0.38 inch each in diameter. As seen in FIGS. 4, conduit component 5 has a normal pipe thread on outer wall 14 of approximately 0.380 inch.

We can adjust orifice 11b's diameter to allow more or less fuel and nitrous oxide into the nozzle, thus regulating horsepower gain. Adjustability is the key to the novel versatility of our nozzle, because of the numerous motor prototypes on the market and their ability to tolerate a range of horsepower gains.

In the preferred embodiment the fuel is comprised of 118 octane Torcol™. This fuel exceeds the requirements of pro stock drag racers running with 10,000+RPM high stress environment or any extremely high cylinder pressure four (4)-cycle motor.

The specific gravity of Torco ™ 118 is 0.699, Reid vapor pressure is 6, distillation F, 10% evaporation at 168; 90% evaporation at 208, color red. The meanings of these figures and units are well known to those in the art.

The Torco racing fuel for our preferred embodiment is available at:

Knoll Gas,
10 M-51 Highway North,
Post Office Box 185,
Decatur, Mo. 49045.

The preferred vaporized fuel to nitrous oxide ratio on a volume to volume basis ranges from approximately 1.0:9.5 in nozzle 4. However, ratios from approximately 1.0 or 1.10:4.0 for the preferred fuel and nitrous oxide are also acceptable.

In the preferred embodiment, the internal nozzle temperature is—(minus) 130 degrees F. However, temperatures from approximately—129.1 to −131.5 F. will suffice if the ratio of nitrous oxide to vaporized fuel, volume to volume, is approximately at least 9.5:1.0 at a constant pressure of 900 psi. In the preferred embodiment the constant volume of the rigid nozzle chamber 4 is 0.093.

The inner diameter of each conduit is approximately 0.38 inch. Our nozzle is manufactured by methods which are well known by those skilled in this particular art.

As seen in FIGS. 4 and 5, the angle between the two entering nitrous oxide and fuel streams in channels 8,10 respectively approaches a laminar flow towards tip 11a. Within conduit component 5 both channels approach each other at an angle of approximately 15 degrees or less.

As seen FIG. 7, channel 8 vents oxidizing gas into apex 39 of a bell-shaped emitter 34. Emitters 34 are nozzle features which are well understood by those well versed in this particular art. The oxidizing gas is introduced under high pressure (900–1,050 psi) through channel 8 into emitter apex 39. The emitter apex 39 in the preferred embodiment is umbrella-shaped. However, differently shaped emitter apexes are also included in the scope of our invention.

Figure 8:
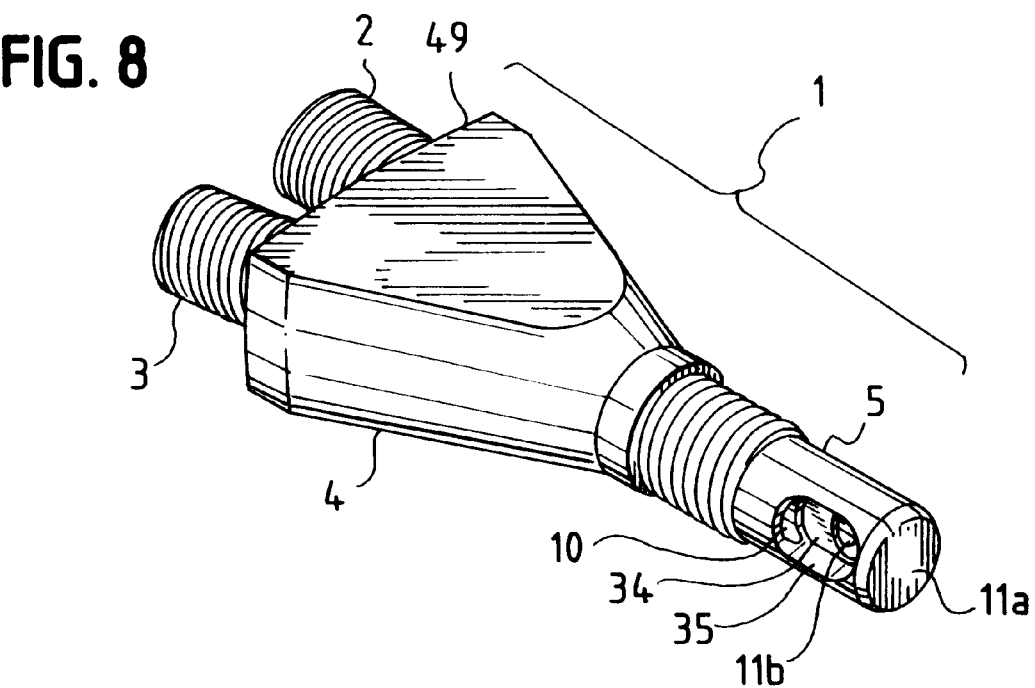
FIG. 8 illustrates a partial three-dimensional view of our nozzle with emitter and related structures partially disclosed.

Upon entering emitter 34, the oxidizing gas immediately expands and flows toward dispersing chamber 35 through emitter orifice 11b. See FIGS. 8 and 9. Channel 10 empties fuel through an aperture in the wall of dispersing cavity 35. Dispersing cavity 35 is simultaneously contiguous with emitter orifice 11b and channel 10.

The high velocity flow of gaseous oxidizer from emitter 34 enters dispersing cavity 35. This flow directly and rapidly causes a decrease in pressure in space adjacent to the gas flow. The partial vacuum thereby created, is immediately filled with liquid fuel from channel 10. The fuel enters the oxidizing gas stream through the wall of dispersing cavity 35. Fuel is dispersed into fine droplets and mixes with the gaseous oxidizer. This last event occurs within dispersing cavity 35, as well as space immediately exterior and adjacent to dispersing cavity 35. As mentioned supra, in the preferred embodiment the gaseous oxidant is nitrous oxide and the fuel is Torco octane 18™.

This internal structure of nozzle 1, fuel and nitrous oxide (the oxidizing agent in the preferred embodiment) empirically produce less turbulence within nozzle 1. This result occurs when (i) the converging angle between channels 8,10 is approximately 15 degrees or less, and (ii) channels' 8,10 termination within emitter components occurs towards tip 11a.

The gas/fuel mixture emanating from the opening in dispersing cavity 35 11b results in a smoother stream of vaporized fuel to the engine. This smoother stream, in turn, increases horsepower because of fewer eddies and shock waves. See FIGS. 2 and 3.

Channels 8,10 are 0.93 inches in diameter at this location. Emitter 34 is 0.180 inches deep.

The emitter dispersing chamber 35 is the location wherein fuel and the gaseous oxidizer initially mix and journey to manifold 54. See FIGS. 2 and 3.

Figure 9:
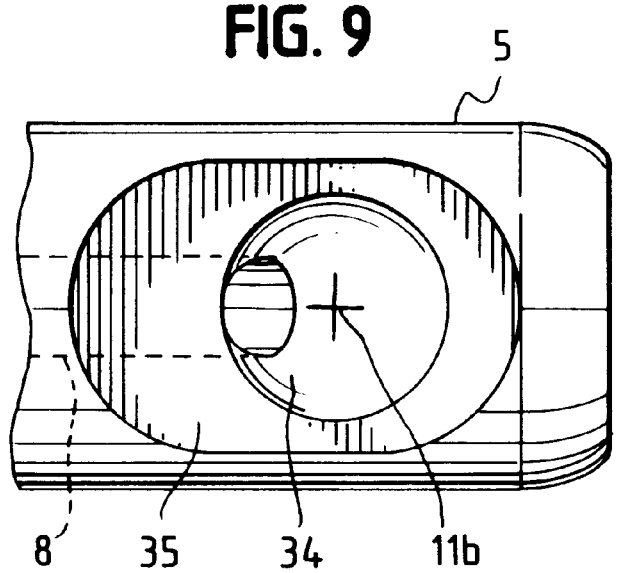
FIG. 9 is an enlarged plan bottom view disclosing emitter, emitter orifice, dispersing chamber, and a channel.

FIG. 9 illustrates emitter 34, orifice 11b, dispersing cavity 35, termination of channel 8 and orifice 11b from a plan bottom view. In the preferred embodiment, fuel 118 octane Torco™ and nitrous oxide each flow physically and chemically separated through incoming channels 8,10. As channels 8 and 10 approach each other at conduit 5, their contents are mixed at approximately 15 degrees or less. The mixture immediately expands through dispersing cavity 35 to enter manifold 54 and continue to the engine or motor.

Although each engine or motor is idiosyncratic, our invention can be tailored to fit any engine and enhance its performance.

We claim:

1. A laminar flow nozzle of one piece design and physically integral structure comprising
   (a) a hollow chamber, said chamber having a first upper end and a second, opposite end, said hollow chamber comprising a first and a second channel,
   (b) a first cylindrical conduit component for transporting a stream of nitrous oxide from said first upper end to said second lower end, said conduit component comprising a jet for controlling said stream of nitrous oxide, said jet comprising an orifice, said orifice having a diameter of approximately 0.016 to 0.136 inches, said orifice leading to said first channel through said conduit component
   (c) a second cylindrical conduit component for transporting a stream of said fuel from said first upper end to said second, lower opposite end of said chamber, said conduit component comprising a jet for controlling said stream of fuel, said jet comprising an orifice leading to said second channel, said jet orifice being approximately 0.016 to 0.136 inches in diameter;
   (d) an aperture at said second lower end of said nozzle
Whereby said vaporized fuel and said nitrous oxide combust at said second opposite end of said nozzle chamber, thereby creating less turbulence and producing more horsepower.

2. An engine system, said system comprising in combination
   (a) a manifold
   (b) at least one nozzle, each said nozzle having a first end and a second end, said nozzle structured for mixing fuel with an oxidizing gas said nozzle comprising a body,
   (c) at least one solenoid
   (d) an engine
   (f) inlet apertures for said oxidizing gas and fuel to said nozzle on said first end
      (i) each said nozzle and said conduits comprising one physically integral device,
      (ii) one said conduit component for transporting oxidizing gas into said nozzle and one said conduit component for transporting fuel into said nozzle, each said conduit component having an upper end and a lower end, each said conduit component having one jet, each said jet located at said upper end of said conduit component, each said jet having an orifice, each said orifice having a diameter of approximately 0.016 to 0.136 inches, each said orifice physically contiguous to a channel within each said conduit component and said nozzle body, each said channel comprising a smooth continuous cylindrical wall, each said channel being hollow,
Whereby
   said fuel and said oxidizing gas flow into said channels in said conduits and then through said body, said channels meeting within said nozzle at an angle of 15 degrees or less, said fuel and said gas interspersed within a mixing chamber, said mixture emitted from said nozzle body through an aperture at said second end, said mixture providing more horsepower and less turbulence upon combustion.

3. A nozzle designed for a racing vehicle engine comprising
   (a) a top end and a bottom end, said nozzle further comprising an interior chamber
   (b) a first cylindrical conduit and a second cylindrical conduit, said first cylindrical conduit comprising a first upper end and a second lower end, said second conduit having a first end and a second lower end, said first conduit providing a channel for transporting nitrous oxide into said nozzle chamber,
   (c) said second conduit providing a separate channel for transporting fuel into said nozzle chamber, said conduits converging towards said bottom end of said nozzle at an angle of approximately fifteen or less degrees,
      (i) each said conduit comprising an inlet port
   (d) a dispersing assembly for mixing fuel and gas, said assembly comprising said bottom end of said nozzle, said assembly comprising
      (i) a bell shaped emitter, said emitter dispersing fuel from said connected channel
      (ii) a dispersing chamber, said dispersing chamber comprising a wall with an aperture,
         said dispersing chamber receiving fuel droplets through said bell shaped emitter, said chamber receiving nitrous oxide through said aperture in said wall,
Whereby
   Said fuel enters through said first conduit and flows through said bell shaped emitter into said dispersing chamber, said nitrous oxide flowing through said second conduit through said aperture into said dispersing chamber, said fuel and gas mixing and rapidly expanding as said mixture leaves said dispersing chamber and enters a manifold or similar device (a) said nozzle and said conduits comprising one physically integral structure,
(b) said fuel demonstrating the following physical characteristics
  (i) specific gravity: 0.699
  (ii) pump octane: R+M/2,118
  (iii) Reid vapor pressure: 6
  (iv) distillation: F
  (v) 10% evaporation: 168
  (vi) 90% evaporation: 208
  (vii) color: red
(c) said jets comprising the tips of said upper ends of both said conduits, said jets each comprising an orifice, said orifices each having a diameter of approximately 0.016 inch to approximately 0.136 inch.

* * * * *